United States Patent [19]

Kulis

[11] Patent Number: 4,664,865
[45] Date of Patent: May 12, 1987

[54] PANEL IN-PART LOCATORS

[75] Inventor: Lawrence J. Kulis, Sterling Heights, Mich.

[73] Assignee: United Technologies Automotive, Inc., Dearborn, Mich.

[21] Appl. No.: 802,509

[22] Filed: Nov. 26, 1985

[51] Int. Cl.$^4$ ............................................. B29C 33/42
[52] U.S. Cl. ................................... 264/320; 264/294; 249/52; 425/195; 425/383
[58] Field of Search ......................... 249/52, 53, 63, 64, 249/122, 140, 142, 151, 160; 425/182, 193, 195, 291, 383, 406, 412, 436 R, 444, 425 R, 817 R; 264/320, 294, 322, 284; 156/245

[56] References Cited

U.S. PATENT DOCUMENTS

| | | | |
|---|---|---|---|
| 1,041,958 | 10/1912 | Buckau | 249/104 |
| 2,327,665 | 8/1943 | Peat | 249/63 |
| 2,536,316 | 1/1951 | Schwartz et al. | 264/320 |
| 3,717,693 | 2/1973 | Kohl et al. | 425/412 |
| 3,880,285 | 4/1975 | March | 264/163 |
| 4,211,590 | 7/1980 | Steward et al. | 156/79 |
| 4,256,797 | 3/1981 | Stamper et al. | 428/215 |

Primary Examiner—Bernard Nozick
Attorney, Agent, or Firm—Robert P. Hayter

[57] ABSTRACT

Apparatus and a method are described for providing positive location openings within a contoured panel. These openings are utilized in conjunction with appropriate locators to assure that positive alignment of the molded panel in subsequent manufacturing operations is obtained. The specific die and headline constructions are likewise disclosed.

4 Claims, 6 Drawing Figures

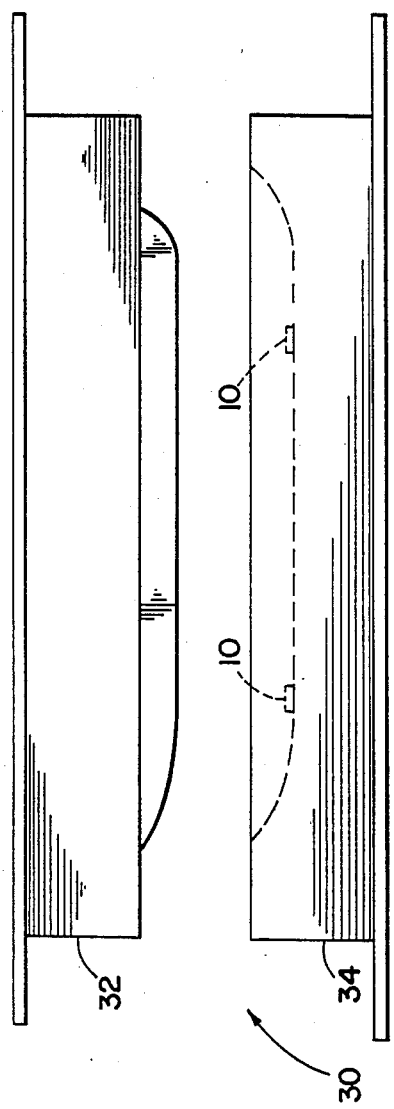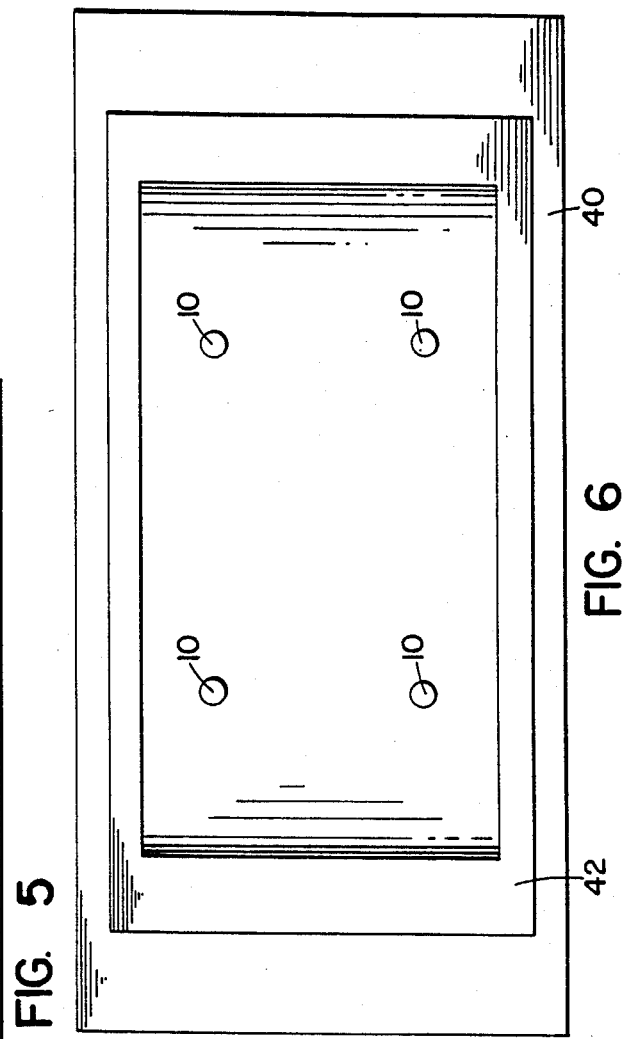

PANEL IN-PART LOCATORS

BACKGROUND OF THE INVENTION

The present invention is directed to the method of manufacture, the die and a molded panel produced as a manufactured part. More specifically, the present invention is directed toward using a die for forming an in-part locator opening in a molded panel such that the panel may be positively located for subsequent manufacturing steps.

Various methods have previously been utilized for part location of molded contoured products through successive manufacturing operations. One method is to mold or punch into the offal area of the product multiple cavities and/or holes during the molding operation. These holes were also punched in an offal area within the product's finished perimeter dimensions where allowed. For a headliner for use in an automobile, such a location might be at a position where either a sun visor or a dome light opening is provided in the headliner, and headliner material is removed for these openings utilizing a secondary pretrimming operation. Hence, the offal area where the dome light hole is located could be punched to provide a location hole and subsequently pretrimmed to be removed. Utilizing this method, indexing conveyor mechanisms would secure the molded panel through the offal section of the product throughout succeeding operations. This method is normally employed where high volumes exist and specific operational layouts can be utilized. This method, however, requires the use of additional substrate material to provide sufficient substrate the offal locations to allow the punched holes to have sufficient structural strength to provide the desired support for locating the part. Hence, this approach is not the most cost effective.

Many automotive interior trim components, such as headliners, are currently designed such that part alignment cannot be utilized or does not afford the best of productivity, quality and economics using an opening in an offal area. Additionally, some of the customer's assembly plants incorporate optional trim outs in their facilities, such as trimming out a portion of the headliner for dome lights or a sun visor. This additional trim out has required further need for positive part alignment within the customer's fixtures to perform this function. The previous use of offal sections is not effective since the offal section has either already been removed or is to be removed as the part is fixtured.

The problem addressed then is in what manner a molded fiberglass headliner or a panel, in general, may be positively located for subsequent manufacturing operations without the expense of providing a substrate in an offal area which must remain on the panel to provide positive location of the panel. The herein described die and method of providing locator openings within the part was developed such that locator openings were molded integrally with the headliner in locations where dimensional thickness is not critical. These locator openings are appropriately sized and positioned such that they may be easily utilized to positively secure the headliner in the desired position. In this manner positive part alignment within successive manufacturing steps may be obtained.

DISCLOSURE OF THE INVENTION

An object of the present invention is to provide a method of positively locating a molded panel for successive manufacturing operations.

A further object of the present invention is to provide a molded panel having integral locator openings useful for positively aligning the headliner during manufacturing operations.

A yet further object of the present invention is to provide a die useful for forming locator openings within a molded panel.

A yet further object of the present invention is to provide a method of positively aligning method panels without requiring offal material for locating the panel during successive manufacturing operations.

It is a still further object of the present invention to provide positive in-part locators in a molded panel without requiring additional molded panel material or manufacturing steps to achieve these openings useful for positive part location.

Another object of the present invention is to provide a safe, economical, reliable and an easy to utilize system for positively maintaining manufactured panels in a desired alignment.

Other objects will be apparent from the description to follow and the appended claims. The above objects are achieved according to the present invention by the provision of a method of manufacturing a molded panel wherein it is necessary to maintain the alignment of the panel throughout multiple process steps. The method includes placing locating dies within a molding tool, said dies being positioned to form a locator opening in the panel when the panel is molded. Thereafter the panel is molded to form a contoured panel having multiple locator openings extending inwardly from the surface of the panel, a distance which is only a portion of the thickness of the panel at the area of the panel where the locator opening is positioned. The panel is then removed from the molding tool and moved to a subsequent processing station wherein multiple locators are positioned to mate with the locator openings in the panel. The panel is then placed in a panel receiving area such that the locator openings in the panel engage the locators in the panel receiving area to assure dimensional alignment of the panel in the subsequent processing station.

Additionally disclosed is a molded panel which defines in-part locator openings including a contoured molded panel of predetermined thickness at selected locations, said panel defining a locator notch extending from one surface of the panel inwardly to serve as an opening for mating with the part locators for assuring positive alignment of the panel for subsequent manufacturing operations. This locator notch is generally annular in configuration and includes a cavity fill area of the panel projecting at the center of the annular locator notch.

BRIEF DESCRIPTION OF THE DRAWINGS

FIG. 5 is a side view of the male and female sections of a molding tool incorporating the locator dies.

FIG. 6 is a top view of a subsequent processing station having locator dies for positioning the panel in this processing station.

DESCRIPTION OF THE PREFERRED EMBODIMENT

The invention herein will be described with reference to a particular embodiment. It is to be understood that other structural configurations might be likewise suitable for providing the function as set forth herein.

Additionally, the invention herein will be described relative to the manufacture of a molded fiberglass headliner for use in an automobile. It is to be understood that this invention has applicability to other molded panel parts for automotive and nonautomotive uses.

Figure 1:
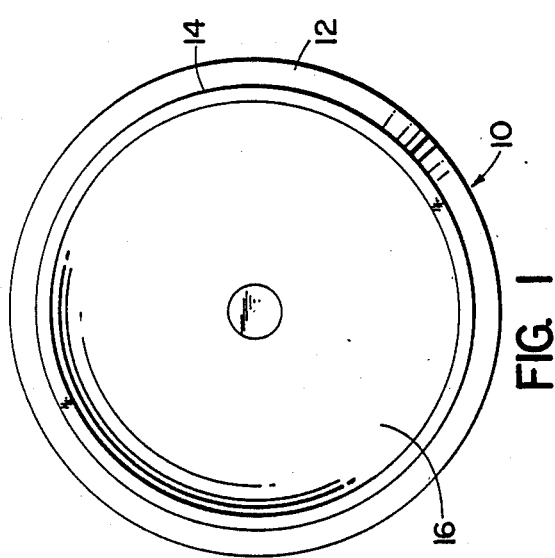
FIG. 1 is a top view of a locator die.
Figure 2:
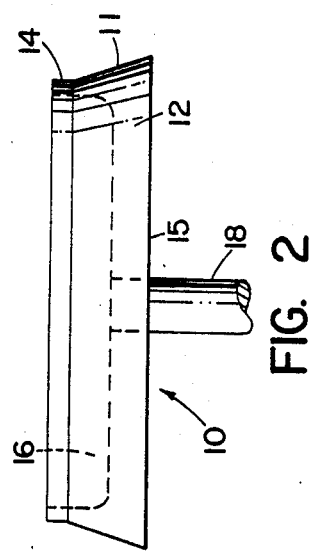
FIG. 2 is a side view of the die of FIG. 1.

Referring first to FIG. 1, there may be seen a top view of locator die 10. Locator die 10 preferably is a machined steel plug having a defined central cavity 16. This locator die has several portions including a flat bottom 15 on base 12 and tapered side walls 11. The interior surface of the tapered side walls 11 defines a cylindrical central cavity within locator die 10. Attached to the top portion of the tapered side wall is annular lip 14. Annular lip 14 has parallel interior and exterior walls. The interior walls are the same diameter as the interior surface of the tapered side walls of the base and likewise define cavity 16. The exterior side wall of lip 14 is generally perpendicular to bottom 15 of locator die 10 in contrast to tapered side wall 11. Attachment rod 18 extends downwardly from the base of locator die 10 and is utilized to secure the locator die to the appropriate molding tool or successive operations area. This single locator die is utilized to both form the annular notch and cavity fill area in the headliner during the molding operation and to serve as a locator to which the headliner is mounted at the various other process stations for fixturing the headliner in the positive location.

Figure 3:
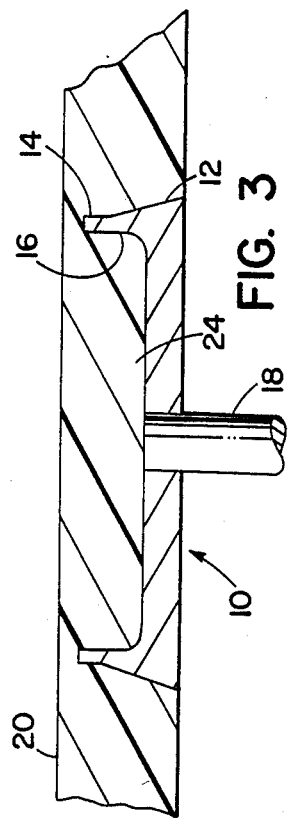
FIG. 3 is a sectional view of the die shown secured within a panel.
Figure 4:
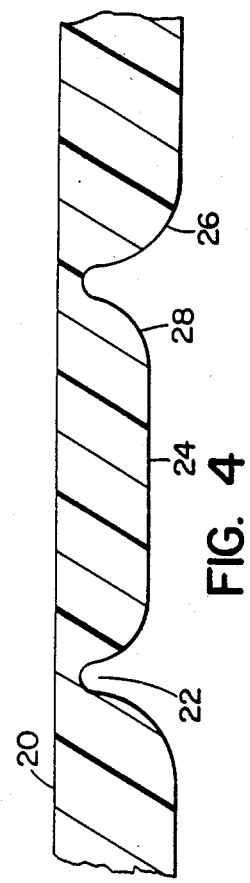
FIG. 4 is a sectional view of the panel after the die has been removed from the panel.

Referring now to FIGS. 3 and 4, there may be seen the manner of the interaction between the headliner and locator die 10. FIG. 3 shows the locator and headliner as compressed in the molding tool (not shown). It can be seen that headliner 10 is compressed such that a cavity fill area 24 is defined within cavity 16 defined by locator die 10. Lip 14 and base 12 additionally extend into the headliner material.

FIG. 4 shows the headliner in cross section once the locator die has been removed. It may be seen that annular locator notch 22 is formed having rounded entry curve 26 extending from the locator notch to the bottom surface of the headliner and fill curve 28 extending from the locator notch to cavity fill area 24. Cavity fill area 24 is that portion of the headliner which is located within cavity 16 of the die when the headliner was molded. This area is of increased density since it has been compressed and does not extend the full thickness of the headliner as compared to the thickness of the headliner immediately adjacent thereto.

It may be seen that fill curve 28 and entry curve 26 promote positioning the headliner on locator dies for subsequent processing operations. Both curves promote the headliner being secured rapidly and fixedly in subsequent processing locations.

FIG. 5 is an end view of molding tool 30 having male section 32 and female section 34. Although not shown, it can be seen that a panel inserted between the two dies will be compressed to form a contoured shape. Locator dies 10 are shown at the bottom of female section 34 of the molding tool extending upwardly such that they will engage the headliner in the manner shown in FIG. 3.

FIG. 6 is a top view of a subsequent processing station 40 which defines a headliner receiving area 42. Within headliner receiving area 42 are mounted four locator dies 10, each extending upwardly in position to mate with the appropriate annular notch and cavity fill area of the headliner as molded from molding tool 30. Hence, the locator dies 10 are positioned in the headliner receiving area to mate with the openings in the headliner such that the headliner is positively affixed for any subsequent operation such as trimming, cutting, scoring, applying decorative fabric, or securing the edges of the decorative fabric to the back surface of the headliner.

The number of process stations incorporating these positive fixturing locators is up to the manufacturer. The same positive locating apparatus may be utilized for many steps.

Additionally, by the use of these locators it is possible to partially manufacture a finished product and to ship it to the end user in such partially-manufactured state. The end user may finish the manufacture then as desired for each specific application and may himself use the positive locators to secure the headliners in a positive alignment manner.

The invention has been described with reference to a particular embodiment. It is to be understood that variations and modifications can be effected within the spirit and scope of the invention.

What is claimed is:

1. A method of making a molded panel wherein it is necessary to maintain the alignment of the panel through multiple process steps which comprises the steps of:
   placing locating dies within a molding tool, said dies being positioned to form multiple locator notches in the panel when the panel is molded;
   molding a panel with the molding tool to form a contoured panel including to form multiple locator notches extending inwardly from a surface of the panel a portion of the thickness of the panel where the locator notches is positioned;
   removing the panel from the molding tool;
   providing a panel receiving station at a subsequent processing location, said station having multiple locators positioned to mate with the locator notches formed in the panel during the step of molding; and
   placing the panel removed from the molding tool in the panel receiving station such that the locator notches in the panel engage the locators in the panel receiving station to assure alignment of the panel in the subsequent processing location.

2. The method as set forth in claim 1 wherein the panel is a portion of an automotive interior trim component and wherein the step of placing includes placing four locating dies in spaced-apart positions, each being located where the panel is sufficiently thick to allow the panel to be formed without the dies extending through the panel.

3. The method as set forth in claim 2 wherein the step of placing includes placing locating dies which are generally cylindrical in configuration and include an extending annular portion which defines a cavity therebetween and wherein the step of molding includes forming locators having an annular locator notch and a cavity fill area centered within the locator notch.

4. A locator die for use in forming an annular locating notch in a molded panel which comprises:
 a cylindrical base having a generally flat bottom and projecting side walls tapered inwardly and which define a cylindrical cavity therebetween; and
 an annular lip mounted to the top of the base side walls, said annular lip defining an interior cylindrical cavity of the same diameter as the cavity defined by the base and having an exterior side wall which is generally perpendicular to the bottom of the base.

* * * * *

UNITED STATES PATENT AND TRADEMARK OFFICE
CERTIFICATE OF CORRECTION

PATENT NO. : 4,664,865

DATED : May 12, 1987

INVENTOR(S) : Lawrence J. Kulis

It is certified that error appears in the above-identified patent and that said Letters Patent is hereby corrected as shown below: Title page:

In the Abstract, line 6: after "and" change "headline" to "headliner"

Column 2, line 14: after "aligning" delete "method" and insert --molded--

Signed and Sealed this

Twenty-eighth Day of February, 1989

Attest:

DONALD J. QUIGG

*Attesting Officer*   *Commissioner of Patents and Trademarks*